United States Patent [19]

Yamauchi

[11] Patent Number: 4,493,984
[45] Date of Patent: Jan. 15, 1985

[54] TEMPERATURE CONTROL DEVICE FOR FIXING HEAT SOURCE OF COPYING MACHINE

[75] Inventor: Koji Yamauchi, Hitachi, Japan
[73] Assignee: Hitachi, Ltd., Tokyo, Japan
[21] Appl. No.: 464,209
[22] Filed: Feb. 7, 1983
[30] Foreign Application Priority Data
  Feb. 8, 1982 [JP] Japan .................................. 57-17507
[51] Int. Cl.³ .............................................. H05B 1/02
[52] U.S. Cl. ..................... 219/501; 219/497; 219/505; 219/216; 323/236
[58] Field of Search ............... 219/216, 508, 505, 509, 219/494, 497, 499, 501, 510, 491; 323/236, 366; 307/117, 252 UA

[56] References Cited
U.S. PATENT DOCUMENTS
3,878,358  4/1975  Barton et al. ........................ 219/497
4,085,309  4/1978  Godel .................................. 219/501
4,214,151  7/1980  Kicherer .............................. 219/511
4,377,739  3/1983  Eckert, Jr. ........................... 219/497

Primary Examiner—M. H. Paschall
Attorney, Agent, or Firm—Antonelli, Terry & Wands

[57] ABSTRACT

A temperature control device for a fixing heat source of a copying machine includes circuits for supplying power to the fixing heat source in synchronism with the zero-cross point of an a.c. signal applied from an a.c. power source. The device functions to supply the full-wave current to the heat source until a first predetermined temperature is sensed by a temperature sensor, to supply the half-wave current to the heat source until a second predetermined temperature is then sensed, and to change the duty factor of the half-wave current after attainment of the second predetermined temperature, thereby maintaining constant the temperature of the heat source with high accuracy.

2 Claims, 10 Drawing Figures

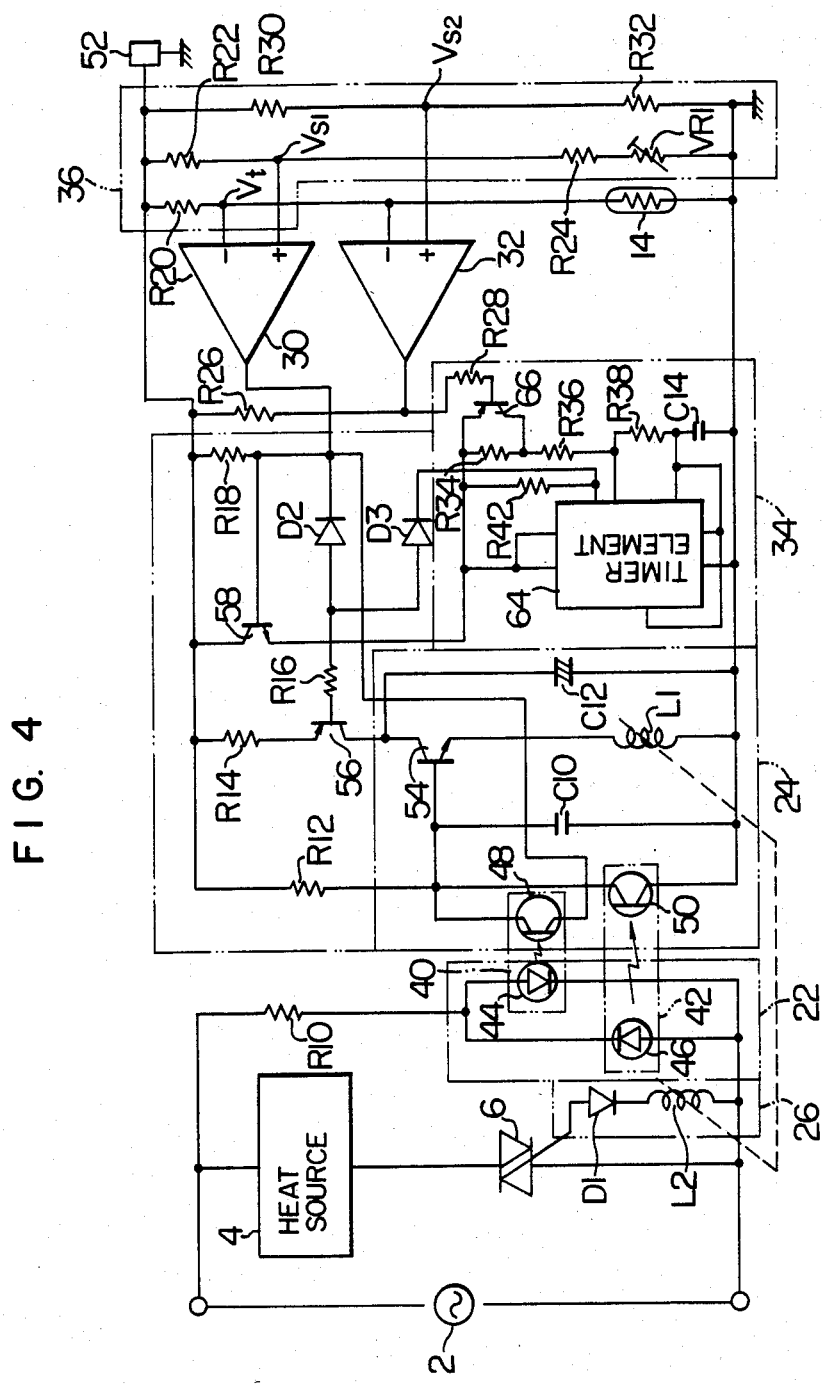
F I G. 4

TEMPERATURE CONTROL DEVICE FOR FIXING HEAT SOURCE OF COPYING MACHINE

This invention relates to a fixing apparatus of a copying machine, and more particularly to a fixing apparatus of the kind above described which includes a temperature control device suitable for the control of the temperature of its fixing heat source.

For the purpose of controlling the temperature of a fixing heat source in a fixing apparatus of a copying machine, a phase control system controlling the operating phase of an a.c. control thyristor as shown in FIG. 1 has been used hitherto. According to the prior art phase control system shown in FIG. 1, the firing phase angle of a thyristor 6 is controlled to control the temperature of a heater 4 which is the fixing heat source generating heat in response to the power supplied from an a.c. power source 2.

The firing phase angle of the thyristor 6 changes depending on the timing of a trigger pulse signal generated from a trigger pulse generator 10 and applied to the thyristor 6 through a pulse transformer 8, and the output timing of the trigger pulse signal is controlled depending on the level of the output signal from an amplifier 12. A thermistor 14 functioning as a temperature sensor sensing the temperature of the heater 4 is connected in series with a resistor R1 to generate a first voltage setting at the connection point, while resistors R2 and R3 are connected in series to generate a second voltage setting at the connection point, so that the level of the output signal from the amplifier 12 changes as a function of the result of comparison between the first and second voltage settings.

Therefore, the phase angle of the thyristor 6 is controlled depending on the sensed temperature of the heater 4, and power corresponding to the firing phase angle $\theta$ of the thyristor 6 as shown in FIG. 2 is supplied to the heater 4.

According to the prior art control system, the temperature of the fixing heat source 4 has been controlled by controlling the firing phase angle $\theta$ of the thyristor 6 in the manner above described. The prior art control system has been defective in that a high voltage applied across the anode A and the cathode K of the thyristor 6 at the turn-on time of the thyristor 6 tends to induce switching noise which adversely affects other electrical apparatus connected to the same power supply line to which the heater 4 is connected.

In order to avoid this problem, a noise filter circuit including capacitors C1, C2, a resistor R4, a coil L and a surge absorbing element CR as shown in FIG. 1 has been connected between the anode A and the cathode K of the thyristor 6 in the prior art control system thereby reducing the harmonic noise. However, although the provision of such a noise filter circuit has been effective for reducing the harmonic noise to some extent, it has been unable to prevent mal-operation of an electronic apparatus such as, for example, a computer connected to the same power supply line and damage to its electronic parts, due to the noise.

A device is known in which, for the purpose of controlling the temperature of a fixing heat source or heater in a copying machine, the heater is turned on-off at the zero-cross point of alternating current supplied from an a.c. power source. Another device is also known in which, for the purpose of controlling the temperature of a fixing heat source or heater in a copying machine, the full wave of alternating current from an a.c. power source is initially supplied to the heater and is then changed over to the half wave at suitable time, then the full wave being then supplied to the heater again when so required.

However, these known control devices have not been fully satisfactory for preventing overheating of the heater and ensuring stable fixing.

It is therefore a primary object of the present invention to provide a novel and improved device for controlling the temperature of a fixing heat source or heater in a copying machine, which prevents mal-operation of electronic apparatus connected to the same power supply line due to generation of electrical noise and prevents also overheating of the heater thereby achieving the desired stable control of the temperature of the heater.

The fixing heat-source temperature control device according to the present invention which attains the above object is featured by the fact that the zero-cross point of an a.c. signal from an a.c. source supplying power to a copying-sheet fixing heat source or heater is detected so as to supply the power to the heater in synchronism with the zero-cross point and that the period of time of supplying power to the heater is controlled as a function of the level of the output signal from a temperature sensor sensing the temperature of the heater.

The above and other objects, features and advantages of the present invention will become apparent from the following detailed description of preferred embodiments thereof taken in conjunction with the accompanying drawings, in which:

FIG. 4 is a circuit diagram showing in further detail the structure of the control device shown in FIG. 3;

Preferred embodiments of the present invention will now be described in detail with reference to the drawings.

Figure 1:
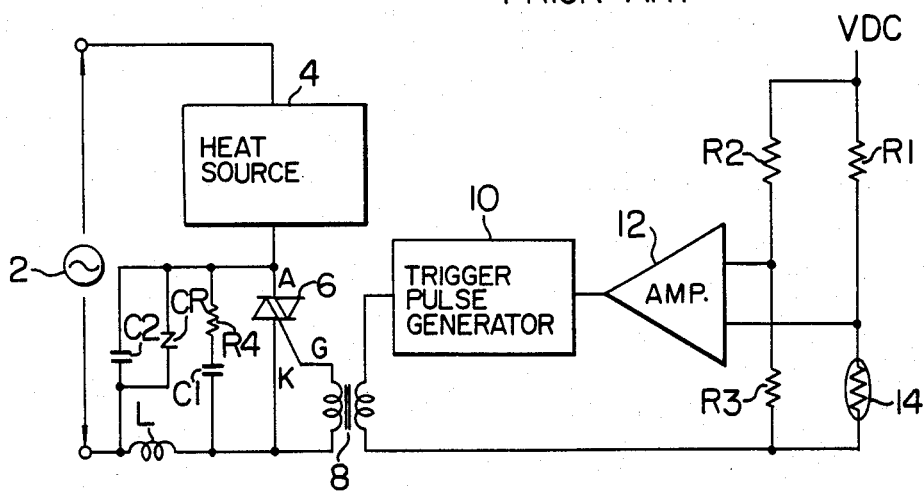
FIG. 1 is a block circuit diagram showing the structure of a control circuit controlling a fixing heat source in a prior art copying machine.
Figure 2:
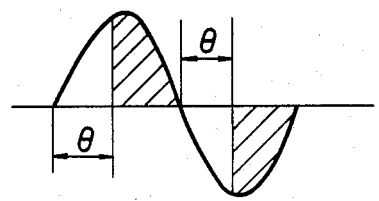
FIG. 2 is a graph illustrating the operation of the prior art control circuit shown in FIG. 1.
Figure 3:
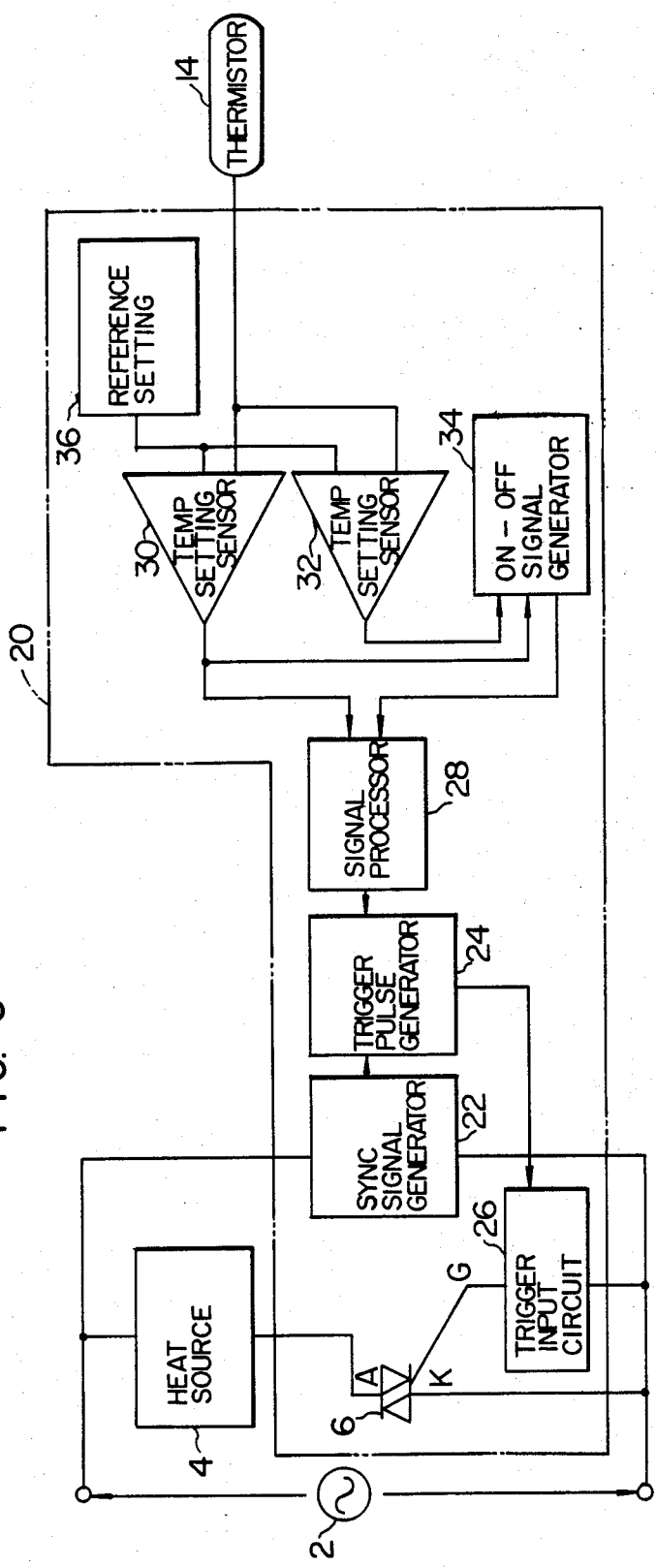
FIG. 3 is a block circuit diagram showing the structure of a preferred embodiment of the fixing heat-source temperature control device according to the present invention.

FIG. 3 shows the structure of a preferred embodiment of the present invention incorporated in a fixing apparatus of a copying machine. Referring to FIG. 3 in which like reference numerals are used to designate like parts appearing in FIG. 1, the fixing apparatus includes a heater 4 functioning as a copying-sheet fixing heat source generating heat in response to the supply of power from an a.c. power source 2, a thermistor 14 functioning as a temperature sensor sensing the temperature of the heat source 4, and a control part 20 receiving the output signal from the thermistor 14 for controlling the power supplied to the heat source 4 in response to the sensor output signal. A thyristor 6 functioning as a power control element controlling the power supplied to the heater 4 is connected in series with the heater 4, and the series connection of the heater 4 and thyristor 6 is connected across the a.c. power source 2.

The control part 20 includes, besides the thyristor 6, a power-source synchronized signal generating circuit 22 connected across the a.c. power source 2 for generating an output signal synchronous with the a.c. signal of the a.c. power source 2, a trigger pulse generating circuit 24 generating a pulse signal for triggering the thyristor 6 in synchronism with the zero-cross point of the a.c. signal of the a.c. power source 2 in response to the application of the output signal of the power-source synchronized signal generating circuit 22, a thyristor trigger signal input circuit 26 functioning as a power supply control circuit for controlling the power supplied to the heater 4 in synchronism with the output signal of the trigger pulse generating circuit 24, a signal processing circuit 28 functioning as a trigger pulse signal generation control circuit for controlling the generation period of the trigger pulse signal depending on the level of the output signal of the temperature sensor 14, a first temperature setting sensing circuit 30, a second temperature setting sensing circuit 32, an on-off signal generating circuit 34, and a reference setting circuit 36.

The trigger pulse generating circuit 24 in the present embodiment detects the zero-cross point of the a.c. signal (at which point the voltage is 0 volts) and generates a trigger pulse signal in synchronism with the zero-cross point. This trigger pulse signal is applied to the thyristor trigger signal input circuit 26 to turn on the thyristor 6. Since this trigger pulse signal is generated in synchronism with the zero-cross point of the a.c. signal, the thyristor 6 is turned on at the time at which the voltage of the a.c. signal is 0 volts. Thus, in the present embodiment, the thyristor 6 is turned on in synchronism with the zero-cross point of the a.c. signal so that any switching noise may not be produced.

Further, in the present embodiment, the generation period of the trigger pulse signal is controlled depending on whether or not the temperature of the heater 4 exceeds the first and second temperature settings sensed by the first and second temperature sensing circuits 30 and 32 respectively, so that the heater 4 can be energized according to the controlled generation period of the trigger pulse signal to ensure stable fixing.

The detailed structure of the temperature control device shown in block circuit form in FIG. 3 will now be described with reference to FIG. 4.

Referring to FIG. 4, the thyristor trigger signal input circuit 26 includes the secondary coil L2 of a pulse transformer and a diode D1. The secondary coil L2 of the pulse transformer provided for applying the trigger pulse signal to the thyristor 6 is connected to the gate of the thyristor 6 through the diode D1. Photo couplers 40 and 42 are provided for generating the signal synchronous with the a.c. signal of the a.c. power source 2. More precisely, the power-source synchronous signal generating circuit 22 includes a pair of light emitting elements 44 and 46 of anti-parallel connection which are connected across the a.c. power source 2 through a resistor R10. The trigger pulse generating circuit 24 includes a pair of light receiving elements 48 and 50 which are disposed opposite to the light emitting elements 44 and 46 respectively and connected to a d.c. power source 52 through a resistor R12 which is included in the signal processing circuit 28.

The circuit 24 further includes a transistor 54, capacitors C10, C12 and the primary coil L1 of the pulse transformer for detecting the zero-cross point of the a.c. signal and generating the trigger pulse signal in synchronous relation with the zero-cross point. The transistor 54 is connected at its base to the outputs of the light receiving elements 48 and 50, and at its collector to the capacitor C12 directly and to the d.c. power source 52 through a transistor 56 and a resistor R14 which are included in the signal processing circuit 28.

The transistor 56 in the signal processing circuit 28 is connected at its base to diodes D2 and D3 through a resistor R16. The diode D2 is connected at its anode to the light receiving element 48, to a resistor R18, to the base of a transistor 58, and also to the output terminal of a comparator 30 which functions as the first temperature setting sensing circuit 30.

The comparator 30 is connected at its minus input terminal to the thermistor 14 and to a resistor R20 included in the reference setting circuit 36. The voltage Vt obtained by dividing the d.c. voltage by the resistor R20 and the thermistor 14 is applied to the minus input terminal of the comparator 30 as a signal indicative of the sensed temperature of the heater 4. The comparator 30 is connected at its plus input terminal to a resistor R22 in the reference setting circuit 36 directly and to a variable resistor VR1 through a resistor R24 in the circuit 36. The voltage obtained by dividing the d.c. voltage by these resistors R22 and VR1 is applied to the plus input terminal of the comparator 30 as a first predetermined or reference voltage Vs1. The thermistor 14 is also connected to the minus input terminal of another comparator 32 which functions as the second temperature setting sensing circuit 32. This comparator 32 is connected at its output terminal to a resistor R26 and to a resistor R28 included in the on-off signal generating circuit 34 and at its plus input terminal to resistors R30 and R32 included in the reference setting circuit 36. The voltage obtained by dividing the d.c. voltage by the resistors R30 and R32 is applied to the plus input terminal of the comparator 32 as a second predetermined or reference voltage Vs2. This second reference voltage Vs2 is so set as to correspond to the predetermined fixing temperature of the heater 4. There is a relation Vs1<Vs2 between the first and second reference voltages Vs1 and Vs2 established by the reference setting circuit 36.

A diode D3 in the signal processing circuit 28 is connected at its anode to the output terminal of a timer element 64 functioning as the on-off signal generating circuit 34. This timer element 64 is, for example, an integrated circuit of model HA-17555 made by Hitachi, Ltd. and constitutes a stable multivibrator circuit. Resistors R34, R36, R38 and a capacitor C14 are provided as circuit elements which determine the condition of oscillation of the multivibrator. A transistor 66 provided for controlling the duty factor of the oscillation output signal of the timer element 64 is connected across the resistor R34. The circuit 34 further includes a resistor R42.

Figure 5:
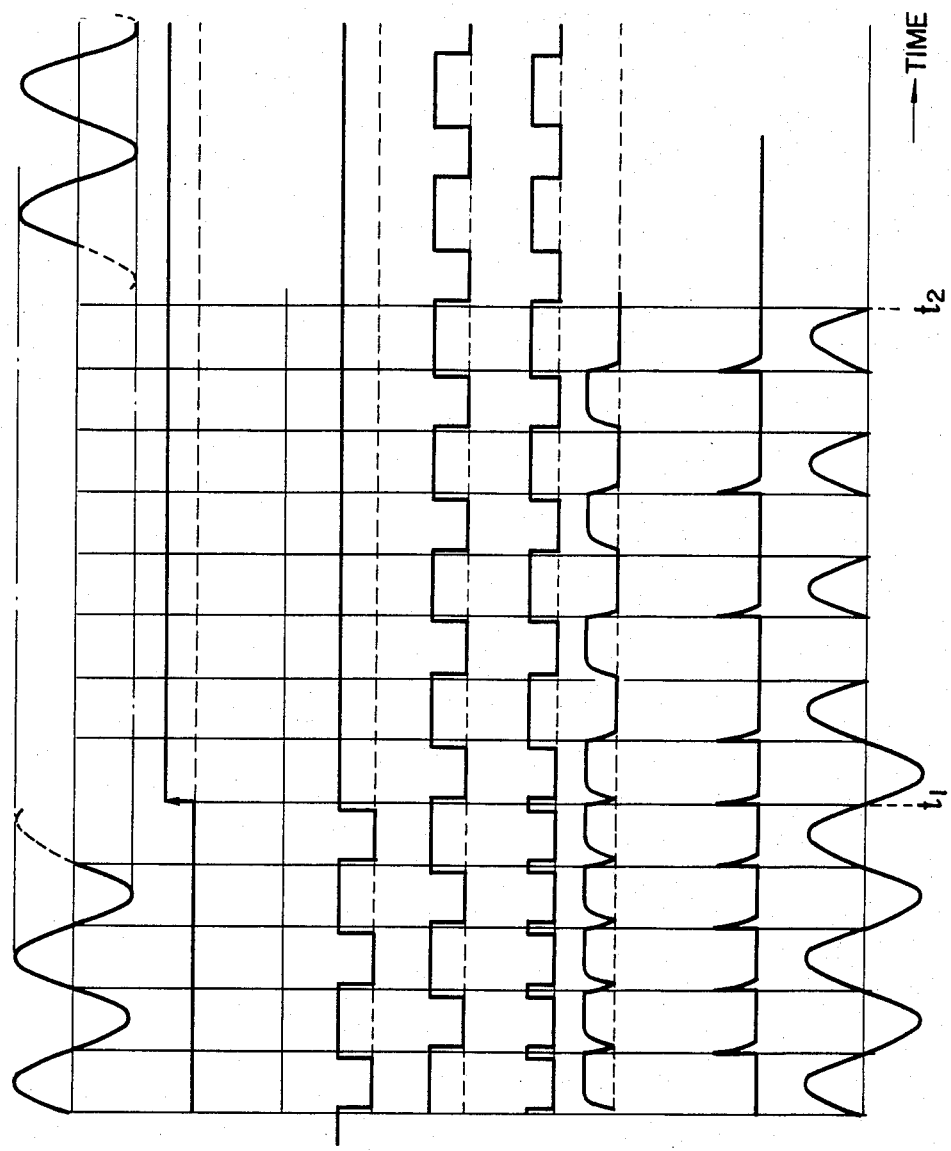
FIG. 5 is a waveform diagram illustrating the operation of the circuit shown in FIG. 4.

The operation of the present embodiment having the aforementioned structure will now be described with reference to FIGS. 5 to 7.

The output signal frm the comparator 30 is in its low level as shown in FIG. 5(B). When the heater 4 is not energized yet and the relation Vt<Vs1 holds. Under such a situation, the transistor 56 is in its on-state, and the capacitor C12 is charged. Since the transistor 58 is in its off-state under such a situation, the d.c. power supply voltage is not supplied to the timer element 64, and this element 64 is in its off-state. Then, when an a.c. signal having a waveform as shown in FIG. 5(A) is applied from the a.c. power source 2 to the elements including the heater 4 and photo couplers 40, 42, the light emitting elements 44 and 46 emit light in synchronism with the a.c. signal applied from the a.c. power source 2. The light receiving elements 48 and 50 receive light emitted from the respective light emitting elements 44 and 46 and operate in a manner as shown in FIGS. 5(C) and 5(D) respectively. It will be seen that the light receiving elements 48 and 50 are repeatedly alternately turned on-off, and a dead zone appears in which both of the light receiving elements 48 and 50 are turned off in the vicinity of each of the zero-cross points of the a.c. signal. In such a dead zone, the voltage shown in FIG. 5(E) is applied to the base of the transistor 54. Consequently, the transistor 54 is turned on at the timing at which both of the light receiving elements 48 and 50 are deenergized. Therefore as shown in FIG. 5(F), the charge stored in the capacitor C12 is discharged to the primary coil L1 of the pulse transformer through the transistor 54 as soon as this transistor 54 is turned on. A trigger pulse as shown in FIG. 5(G) is induced across the secondary coil L2 of the pulse transformer to trigger or turn on the thyristor 6. As a consequence, a current having a waveform as shown in FIG. 5(H) is supplied to the heater 4.

In the present embodiment, the capacitor C10 acts to delay the turn-on operation of the transistor 54 even when the base voltage of the transistor 54 may vary with timing as shown in FIG. 5(E), so that the trigger pulse signal can be generated in exact coincidence with the zero-cross point of the a.c. signal.

Thus, in the present embodiment, the thyristor 6 is turned on in synchronism with the zero-cross point of the a.c. signal, so that the turning-on of the thyristor 6 does not in any way result in generation of higher harmonics providing the source of switching noise.

While the heater 4 is continuously energized by the full-wave current as shown in FIG. 5(H), the resistance value of the thermistor 14 decreases progressively until finally the relation Vt<Vs1 holds at time t1 between the voltage inputs Vt and Vs1 to the comparator 30. At this time t1, the output signal from the comparator 30 turns into its high level and is maintained in such a level thereafter as shown in FIG. 5(B). Consequently, the emitter potential of the light receiving element 48 turns into a high level, and the light receiving element 48 remains in its high-level state after this time t1 as shown in FIG. 5(C). As soon as the output signal of high level appears from the comparator 30, the transistor 56 is turned off, and the transistor 58 is turned on. The power supply voltage is now supplied to the timer element 64 to place the timer element 64 in operation. Therefore, the transistor 56 having been truend off as a result of appearance of the output signal of high level from the comparator 30 is now controlled by the output signal of the timer element 34. This is because the transistor 56 is connected to the timer element 34 through the resistor R16 and diode D3 to be turned on when the output signal of low level appears from the timer element 64. Therefore, the capacitor C12 is charged at the timing at which the transistor 56 is turned on.

Since the light receiving element 48 remains in its high-level state after time t1, the transistor 54 is turned on in alternate periods of the a.c. signal applied from the a.c. power source 2. Therefore, the half-wave current is supplied to the heater 4 after time t1 as shown in FIG. 5(H).

Since the transistor 56 is now controlled by the on-off signal applied from the timer element 34, the thyristor 6 is also on-off controlled. The duty factor of on-off of the thyristor 6 is determined by the resistors R34, R36, R38, capacitor C14 and transistor 66. However, the relation Vt<Vs2 holds between the voltages Vt and Vs2 until the temperature of the heater 4 rises up to the second temperature setting, and the output signal of the comparator 32 is in its low level to maintain the transistor 66 in its on-state. In this case, the duty factor is substantially determined by the resistance values of the resistors R34, R36, R38 and the capacitance value of the capacitor C14.

The duty factor of the on-off output signal from the timer element 64 in the present embodiment is calculated as follows:

The high-level duration $T_H$ of the timer output signal is given by $$T_H = 0.693 \times (RA + 2RB) \times C$$

The low-level duration $T_L$ of the timer output signal is given by $$T_L = 0.693 \times RB \times C$$

The duty factor D1 is calculated according to the expression $$D_1 = \frac{RB}{RA + 2RB} \times 100(\%)$$

In the above expressions, RA, RB and C represent the resistance value ($\Omega$) of the resistor R36, the resistance value ($\Omega$) of the resistor R38, and the capacitance value ($\mu$F) of the capacitor C14, respectively.

Suppose now that the resistance value of the resistor R36 is 20 k$\Omega$, that of the resistor R38 is also 20 k$\Omega$, and the capacitance value of the capacitor C14 is 147 $\mu$F. Then, after the temperature of the heater 4 has attained the first temperature setting, an on-off signal of $T_H = 6$ sec and $T_L = 2$ sec appears from the timer element 64 as shown in FIG. 6, and its duty factor D1 is 33%.

As the heater 4 is further continuously energized, the temperature of the heater 4 exceeds finally the second temperature setting, and the relation Vt>Vs2 holds now between the voltage inputs Vt and Vs2 to the comparator 32. The output signal of high level appears now from this comparator 32 to apply a reverse bias voltage to the transistor 66 thereby turning off this transistor 66. As a consequence, the resistor R34 is connected to the resistor R36 to increase the proportion of the resistance value RA relative to the duty factor, and the on-off output signal from the timer element 64 changes to that in which the on-duration of the transistor 56 is extended. Suppose that the resistance value of the resistor R34 is 80 k$\Omega$. Then, an on-off signal of $T_H = 14$ sec and $T_L = 2$ sec as shown in FIG. 6 appears now from the timer element 34, and its duty factor D2 is 14%.

Therefore, when the temperature of the heater 4 exceeds the second temperature setting which is equal to the predetermined fixing temperature, the proportion of the period of time in which the heater 4 is not energized is increased. There may be such a case that the energizing current is not necessarily supplied to the heater 4 in coincident relation with the zero-cross point of the a.c. signal at the time at which the output signal from the timer element 64 is interrupted. However, such a non-coincidence will not adversely affect the operation, as a matter of fact.

Figure 7:
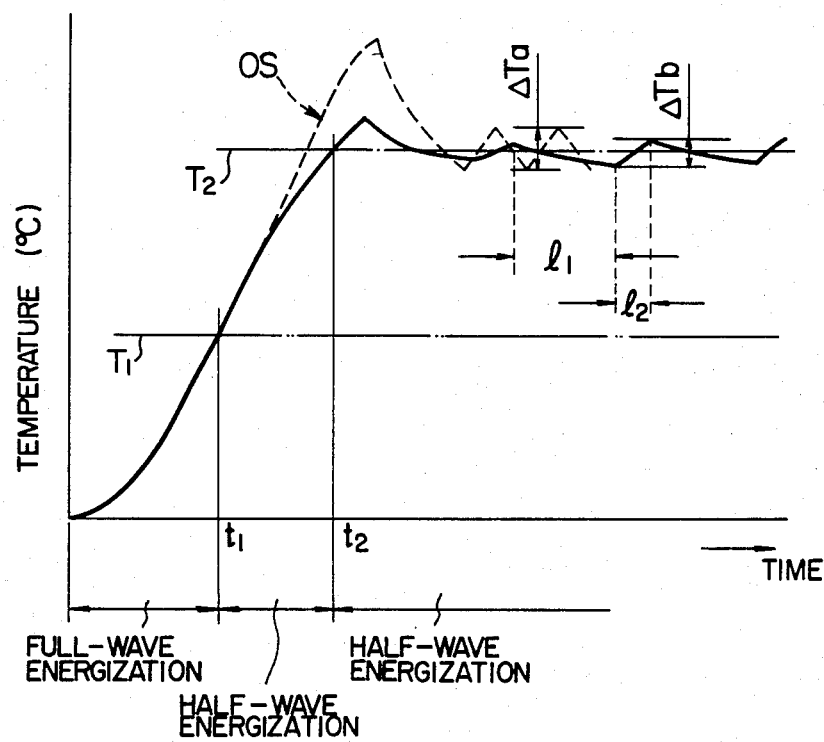
FIG. 7 is a graph showing the temperature characteristic of the heat source controlled by the embodiment of the present invention shown in FIG. 3.

Thus, in the present embodiment, the heater 4 is energized by the full-wave current until the temperature of the heater 4 rises up to the first temperature setting T1, then energized by the half-wave current of duty factor D1 until the second temperature setting T2 is attained after attainment of the first temperature setting T1, and subsequently energized by the half-wave current of duty factor D2 after the second temperature setting T2 has been attained, as shown in FIG. 7.

The advantage of such an energization process will be described. When, for example, the heater 4 is continuously energized by the full-wave current throughout the fixing stage, an excessive temperature overshoot as shown by the broken curve OS in FIG. 7 occurs after the temperature of the heater 4 has attained the fixing temperature level, with the result that the toner attaches to, for example, the sheet transport rollers thereby spoiling the background of a copy. In contrast, in the present embodiment, the first temperature setting T1 is selected to be lower than the fixing temperature, and the heater 4 is gradually energized by the half-wave current of duty factor D1 after the temperature of the heater 4 has attained this first temperature setting T1, so that an undesirable excessive temperature overshoot which may occur after the temperature of the heater 4 has attained the second temperature setting T2 equal to the fixing temperature can be suppressed to a minimum as indicated by the solid curve in FIG. 7. That is, the heater 4 is quickly energized by the full-wave current until the first predetermined temperature level T1 is attained. After attainment of this temperature level T1, the heater 4 is slowly energized by the half-wave current, and, after attainment of the second predetermined temperature level T2, the duty factor of the half-wave current is further controlled.

Figure 6:
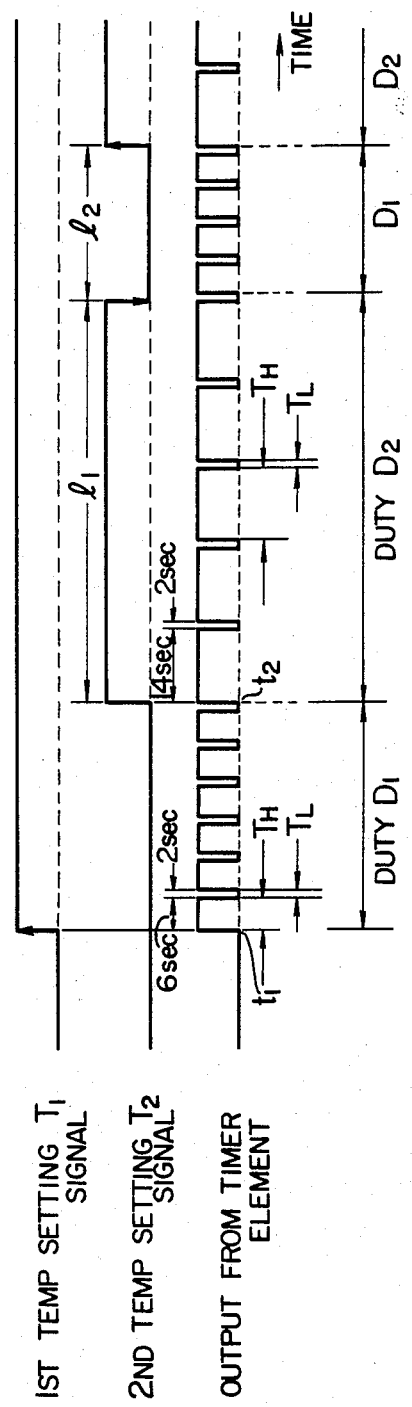
FIG. 6 is a waveform diagram illustrating the manner of duty factor control in the circuit shown in FIG. 4.

It is an important feature of the present embodiment that, after the temperature of the heater 4 has attained the second temperature setting T2, the duty factor of the on-off output signal from the timer element 64 alternates between the values D1 and D2 as seen in FIG. 6. It is also another important feature that the energizing length of time l2 is short relative to the heat radiating length of time l1, so that the temperature variation relative to the fixing temperature T2 can be limited to within a narrow range $\Delta T_b$ as seen in FIG. 7. The broken curve portion following the overshoot OS in FIG. 7 represents the case in which the heater 4 is continuously energized by the full-wave current, and it will be seen that the temperature varies within a considerably wide range $\Delta T_a$ relative to the fixing temperature T2.

It will be understood that, according to the first embodiment of the present invention, the heat source 4 can be energized without inducing any electrical noise, and the temperature of the heat source 4 can be stably maintained at the fixing level.

Figure 8:
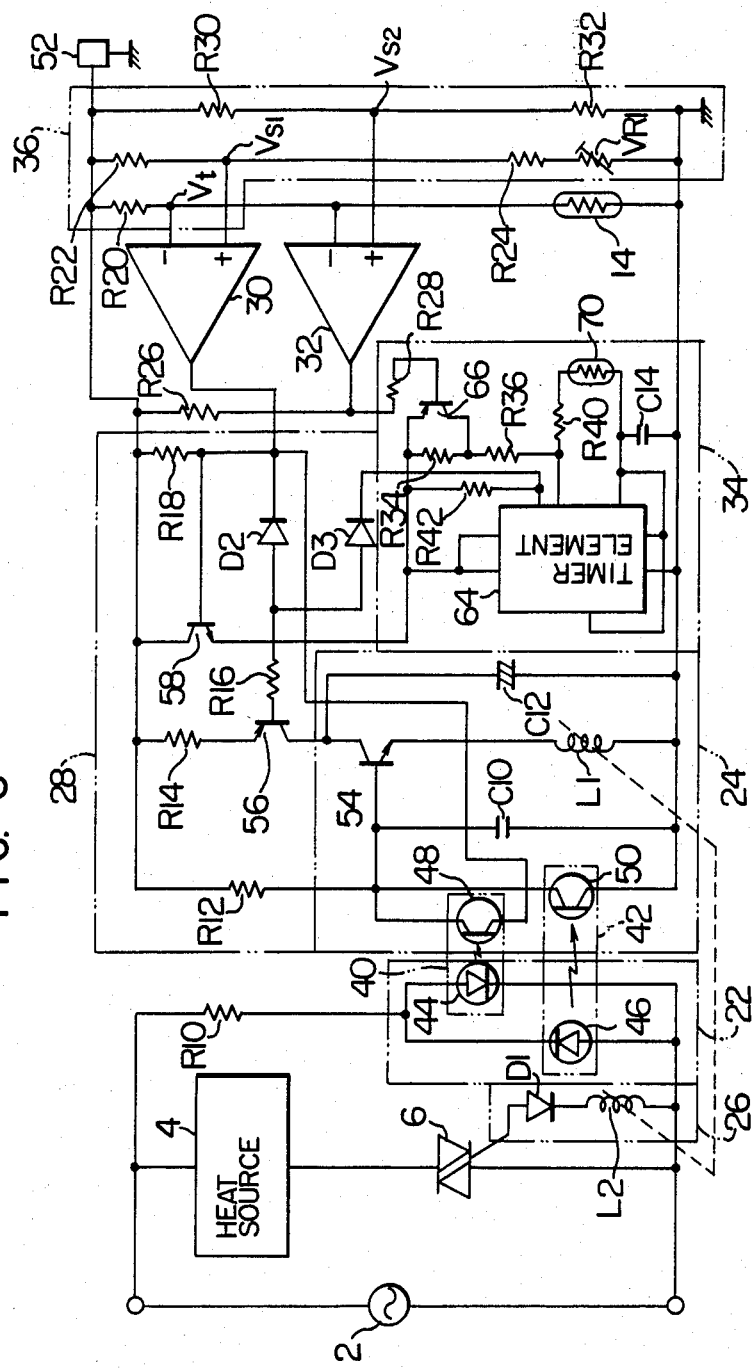
FIG. 8 is a circuit diagram showing the structure of another preferred embodiment of the present invention.

FIG. 8 shows the structure of another embodiment of the present invention. This second embodiment differs from the first embodiment merely in the point that the resistor R38 connected to the timer element 64 shown in FIG. 4 is replaced by a series connection of a resistor R40 and a thermistor 70. Other parts are similar to those shown in FIG. 4, and, therefore, the same parts are designated by the same reference numerals to dispense with repetition of explanation of such parts.

This second embodiment is designed so that the fixing temperature can be stably controlled irrespective of variations of the room temperature. That is, when the duty factor of the on-off signal generated from the timer element 64 is maintained constant, an excessive variation in the room temperature may result in undesirable overheating of the heater 4.

Figure 9:
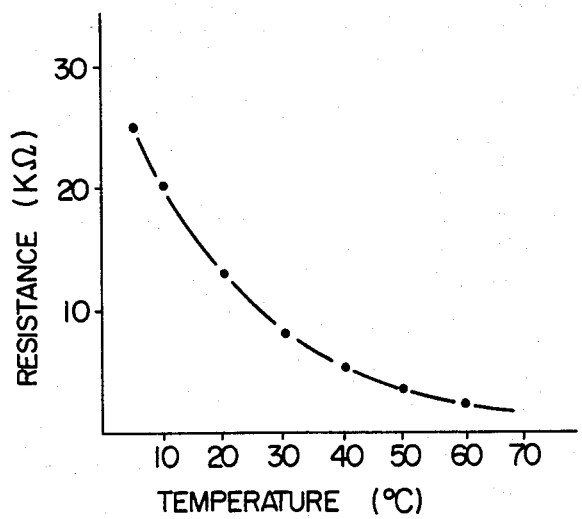
FIG. 9 is a graph showing the temperature-resistance characteristic of the thermistor in the circuit shown in FIG. 8.
Figure 10:
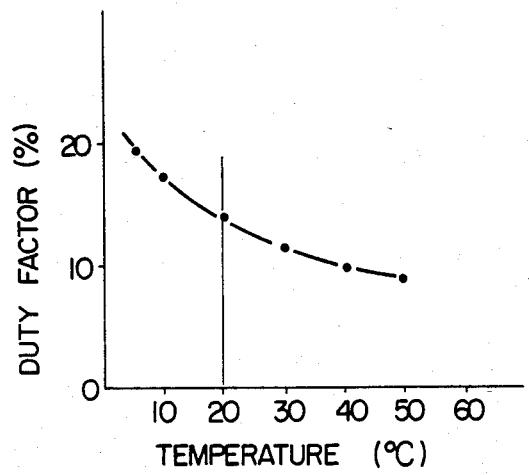
FIG. 10 is a graph showing the temperature-duty factor characteristic of the timer element in the circuit shown in FIG. 8.

In order to avoid such a trouble, a thermistor 70 having a temperature-resistance characteristic as shown in FIG. 9 is inserted in the circuit of the timer element 64 so that the duty factor D1 of the on-off output signal from the timer element 64 has a duty-temperature characteristic as shown in FIG. 10 in spite of variations in the room temperature. By virtue of the duty-temperature characteristic shown in FIG. 10, the duty factor D1 of the on-off output signal from the timer element 64 in this second embodiment increases with the fall of the room temperature and decreases with the rise of the room temperature. Therefore, undesirable overheating of the heater 4 can be prevented by elongating the length of time of energization of the heater 4 when the room temperature is low and by shortening the length of time of energization of the heater 4 when the room temperature is high.

Although the duty factor D1 only has been referred to, it is apparent that the same applies to the duty factor D2. The term "room temperature" is used herein to indicate the temperature of the room in which the copying machine is installed and to indicate also the temperature of the atmosphere ambient to the copying machine.

It will thus be understood that this second embodiment is also as effective as the first embodiment, and the heat source of the fixing apparatus can operate stably at the controlled temperature irrespective of variations in the room temperature.

It will be appreciated from the foregoing detailed description of the present invention that the heat source of the fixing apparatus can operate stably at the controlled temperature without inducing any electrical noise giving rise to disturbance.

I claim:
1. A temperature control device for a fixing heat source of a copy machine including:
   an a.c. power source;
   a heat source generating heat by being energized by power supplied from said a.c. power source thereby fixing an image transferred onto a copying sheet;
   at least one temperature sensor for sensing the temperature of said heat source to provide a temperature-indicative signal; and
   control means for controlling the power supplied from said a.c. power source to said heat source in response to the temperature-indicative signal applied from said temperature sensor,
   said control means comprising:

a trigger pulse generating circuit detecting the zero-cross point of the a.c. waveform supplied from said a.c. power source thereby generating a trigger pulse signal in synchronism with the zero-cross point;

a power supply circut permitting supply of the power from said a.c. power source to said heat source in response to said trigger pulse signal; and a control signal generating circuit generating a control signal for controlling said trigger pulse generating circuit, said control signal generating circuit being composed of a first reference setting means for setting a first reference voltage according to a first predetermined temperature lower than a fixing temperature, a second reference setting means for setting a second reference voltage according to a second predetermined temperature corresponding to the fixing temperature, a first comparator for comparing said temperature-indicative signal provided from the temperature sensor with the first reference voltage provided from the first reference setting means, a second comparator for comparing said temperature-indicative signal provided from the temperature sensor with the second reference voltage provided from the second reference setting means, an ON-OFF signal generating circuit controlled at an actuating condition by the output signal of the first comparator, for controlling an ON-OFF duty factor by the output of the second comparator, and a signal processor for controlling said trigger pulse generating circuit by receiving the output of the first comparator and the output signal of the ON-OFF signal generating circuit, whereby said power supply circuit supplies a full-wave current from said a.c. power source to the heat source until the temperature sensor detects said first predetermined temperature, and a half-wave current from said a.c. power source to the heat source until said temperature sensor detects said second predetermined temperature after said first predetermined temperature has been detected, and then after the second predetermined temperature has been detected by the temperature sensor, the duty factor of the half-wave current is reduced to maintain the temperature of the heat source at a constant value.

2. A temperature control device according to claim 1, wherein said ON-OFF signal generating circuit comprises a room temperature sensor sensing the room temperature for decreasing said duty factor with the rise of the room temperature and increasing said duty factor with the fall of the room temperature thereby maintaining constant the temperature of said heat source irrespective of variations in the room temperature.

* * * * *